(12) United States Patent
Filipescu et al.

(10) Patent No.: US 8,855,141 B2
(45) Date of Patent: Oct. 7, 2014

(54) METHODS, SYSTEMS, AND COMPUTER READABLE MEDIA FOR UTILIZING METADATA TO DETECT USER DATAGRAM PROTOCOL (UDP) PACKET TRAFFIC LOSS

(71) Applicant: Ixia, Calabasas, CA (US)

(72) Inventors: Emilian-Mihai Filipescu, Ramnicu Valcea (RO); Andrei Cipu, Bucharest (RO); Radu Bulboaca, Bucharest (RO)

(73) Assignee: Ixia, Calabasas, CA (US)

( * ) Notice: Subject to any disclaimer, the term of this patent is extended or adjusted under 35 U.S.C. 154(b) by 26 days.

(21) Appl. No.: 13/631,847

(22) Filed: Sep. 28, 2012

(65) Prior Publication Data

US 2014/0086066 A1 Mar. 27, 2014

(30) Foreign Application Priority Data

Sep. 21, 2012 (RO) .............................. A/00675-2012

(51) Int. Cl.
*H04J 3/16* (2006.01)
*H04L 12/26* (2006.01)

(52) U.S. Cl.
CPC ........ *H04L 43/0829* (2013.01); *H04L 43/0835* (2013.01); *H04L 43/50* (2013.01)
USPC ....................................................... 370/468

(58) Field of Classification Search
CPC ... H04L 47/196; H04L 43/50; H04L 12/2697; H04L 43/12; H04L 47/10
USPC .......................................................... 370/468
See application file for complete search history.

(56) References Cited

U.S. PATENT DOCUMENTS

| | | | | |
|---|---|---|---|---|
| 7,457,868 | B1* | 11/2008 | Guo .............................. | 709/224 |
| 7,808,918 | B2* | 10/2010 | Bugenhagen .................. | 370/242 |
| 2004/0258066 | A1* | 12/2004 | Chen et al. .................... | 370/390 |
| 2008/0151933 | A1* | 6/2008 | Vasseur et al. ................ | 370/468 |
| 2009/0070882 | A1* | 3/2009 | Grass et al. ..................... | 726/26 |
| 2009/0119729 | A1* | 5/2009 | Periman et al. ............... | 725/114 |
| 2010/0103822 | A1* | 4/2010 | Montwill ...................... | 370/242 |
| 2013/0107708 | A1* | 5/2013 | Yamamoto .................... | 370/231 |

* cited by examiner

*Primary Examiner* — Fan Ng
(74) *Attorney, Agent, or Firm* — Jenkins, Wilson, Taylor & Hunt, P.A.

(57) ABSTRACT

Methods, systems, and computer readable media utilizing metadata to detect UDP traffic loss in a test environment are disclosed. In one example, the method includes generating, at a user datagram protocol (UDP) traffic generation module, a plurality of UDP packets associated with a UDP stream, wherein origination information corresponding to the UDP traffic generation module is included in a payload in each of the plurality of UDP packets and receiving, at a UDP traffic receiver module, at least one of the plurality of UDP packets associated with the UDP stream. The method also includes transmitting, from the UDP traffic receiver module to the UDP traffic generation module, recipient information that identifies the UDP traffic receiver module as the receiver of the UDP stream and receiving, at the UDP traffic receiver module via a lossless environment, stream verification metrics from the UDP traffic generation module.

27 Claims, 5 Drawing Sheets

METHODS, SYSTEMS, AND COMPUTER READABLE MEDIA FOR UTILIZING METADATA TO DETECT USER DATAGRAM PROTOCOL (UDP) PACKET TRAFFIC LOSS

PRIORITY CLAIM

This application claims the benefit of Romanian Patent Application No. A/00675-2012, filed Sep. 21, 2012; the disclosure of which is incorporated herein by reference in its entirety.

TECHNICAL FIELD

The subject matter described herein relates to network equipment testing. More specifically, the subject matter relates to methods, systems, and computer readable media for utilizing metadata to detect user datagram protocol (UDP) traffic loss.

BACKGROUND

In a network element test environment, the ability to generate an accurate loss statistic for stateless user datagram protocol (UDP) traffic is difficult to achieve. Specifically, a UDP packet does not contain sufficient information within the packet header to allow for the detection or identification of missing UDP packets lost at the end of the stream. Likewise, entire UDP streams may also be lost due to UDP packets not containing information that can be used to identify lost UDP packets associated with a common stream. The inability to detect or identify lost UDP packets can result in inefficiencies and increased costs within a test environment.

Accordingly, in light of these difficulties, a need exists for methods, systems, and computer readable media for utilizing metadata to detect UDP packet traffic loss.

SUMMARY

Methods, systems, and computer readable media for utilizing metadata to detect user datagram protocol (UDP) packet traffic loss are disclosed. In one embodiment, the method includes generating, at a user datagram protocol (UDP) traffic generation module, a plurality of UDP packets associated with a UDP stream, wherein origination information corresponding to the UDP traffic generation module is included in a payload in each of the plurality of UDP packets and receiving, at a UDP traffic receiver module, at least one of the plurality of UDP packets associated with the UDP stream. The method also includes transmitting, from the UDP traffic receiver module to the UDP traffic generation module, recipient information that identifies the UDP traffic receiver module as the receiver of the UDP stream and receiving, at the UDP traffic receiver module via a lossless environment, stream verification metrics from the UDP traffic generation module.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for utilizing metadata to detect user datagram protocol (UDP) packet traffic loss. Although the following description describes the present subject matter as applied to UDP packet communication via a network element test environment, the disclosed methods, systems, and computer readable media may be applied to other networks, packet-based protocols, and/or applications without departing from the scope of the present subject matter. For example, the present subject matter may be applied to any communication network in which packet-based signaling/messaging is configured to traverse different network elements or devices and packet loss is a concern.

According to one aspect of the present subject matter, a UDP test packet generator associated with a test system is adapted to generate a related sequence of UDP packets that are assigned to a UDP stream, where the UDP stream is identified within the test system by a unique stream identifier (StreamID) value. Further, each UDP packet associated with the stream is modified to include the stream identifier value in the payload portion of the packet. Also included in the payload portion of the packet is a sequence number identifier which indicates the number and relative order and/or position of the UDP packet within the UDP stream.

Each UDP packet in the stream is transmitted from a first test port associated with the test system, where in one embodiment the first test port is identified by a first card identifier and a first port identifier. It will be appreciated that in other embodiments of the present invention, other identifiers that can be used to identify the first test port may be used. Prior to transmission, the card identifier and port identifier associated with the UDP test packet generator of the packet is also included in the payload of each UDP test packet in the stream. After traversing a system or device under test, the UDP stream is received by a UDP test packet receiver. Upon receiving the UDP stream, the UDP test packet receiver utilizes information contained in the packet payload(s) to confirm its recipient status via a lossless environment/connection. The lossless environment/connection may then be used by the UDP test packet generator to provide stream verification metrics to the UDP test packet receiver, which in turn uses the information to generate an accurate loss statistic for the received UDP packet stream.

Figure 1:
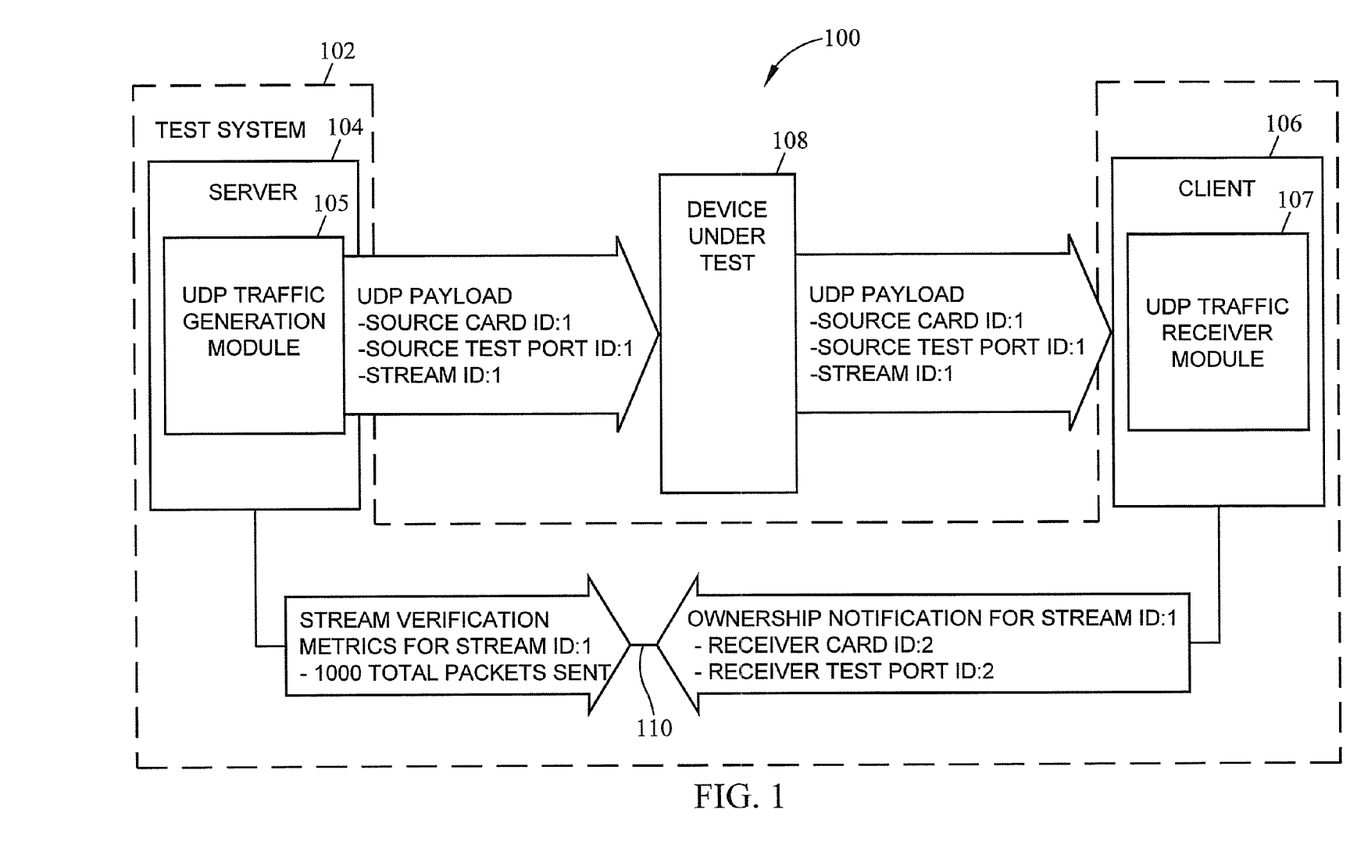
FIG. 1 is a diagram illustrating a test environment utilizing an exemplary inter-port communication pathway to conduct signaling via a lossless backplane connection according to an embodiment of the subject matter described herein.

FIG. 1 depicts an exemplary test environment 100 utilizing an exemplary inter-port communication pathway to conduct signaling via a lossless backplane connection according to an embodiment of the subject matter described herein. In the embodiment shown in FIG. 1, test environment 100 may include a test system 102 that generates UDP packet streams that traverse a device under test (DUT) 108. In some embodiments, DUT 108 may include a network address translator (NAT) device, a firewall device, a network router, a proxy server, a gateway element, or the like. Test system 102 may comprise a server element 104 and a client element 106. In some embodiments, server element 104 and client element 106 may comprise a source (or receiver) card, a chassis blade, or any other device that includes at least one port for sending or receiving UDP packets to each other or via DUT 108.

In one embodiment, server element 104 may contain a UDP traffic generation module 105 that is configured to generate a UDP stream that includes a plurality of UDP packets. Each UDP packet generated by UDP traffic generation module 105 includes a payload section that is configured to contain origination information associated with server element 105. For example, the origination information may include a stream identifier, a sequence identifier, an originating (i.e., source) card/blade identifier, and an originating (i.e., source) port identifier. The stream identifier may include an alphanumeric identifier that is associated with and identifies the generated UDP packet stream (e.g., "Stream ID: 1"). The sequence identifier is a numeric identifier that identifies a single packet with respect to a particular UDP packet stream. For example, the sequence identifier may indicate the number and relative order and/or position of the UDP packet within the UDP stream (e.g., Sequence #: 1000). The originating card/blade identifier and originating port identifier may refer to identifiers/numbers corresponding to a specific card/blade (e.g., Source Card ID: 1) that makes up server element 104 and a specific receiving port (e.g., Source Test Port ID: 1) belonging to server element 104, respectively. In one embodiment, the generated UDP stream is directed to client element 107 via DUT 108.

In one embodiment, client element 106 may include a UDP traffic receiver module 107 that is configured to receive a UDP stream that includes a plurality of UDP packets. For example, UDP traffic receiver module 107 may receive a UDP packet stream generated by UDP traffic generation module 105 and forwarded by DUT 108. Upon receiving a UDP packet from DUT 108, UDP traffic receiver module 107 is configured to access at least a portion of the origination information included in the packet payload. For example, UDP traffic receiver module 107 may extract the stream identifier (e.g., "Stream ID: 1"), originating card identifier (e.g., Source Card ID: 1) and originating port identifier (e.g., Source Test Port ID: 1) from a received UDP packet. UDP traffic receiver module 107 may then generate an ownership notification message that includes the stream identifier extracted from the received UDP packet and recipient information, such as a receiver card identifier (e.g., Receiver Card ID: 2) and a receiver test port identifier (e.g., Receiver Test Port ID: 2) associated with client element 106. Notably, the stream identifier included in the ownership notification message serves as an indication that client element 106 is the actual recipient (i.e., the end destination) of the received UDP stream associated with the stream identifier (e.g., "Stream ID: 1") included in the message. The ownership notification message may be addressed to server element 104 using the source card identifier and the source port identifier included in the received UDP packet. Notably, the ownership notification message is communicated to server element 104 via a lossless environment. As used herein, "lossless" or "no loss" indicates that information communicated between a UDP test packet generator (e.g., server element 104) and a UDP test packet receiver (e.g., client element 106) via a preferred communication pathway will not be lost as a result of the transmission process associated with the communication pathway. In FIG. 1, the lossless environment includes a "no loss" backplane connection 110. Exemplary backplane connection 110 may comprise an Ethernet fabric, a parallel communication bus, a serial communication bus, or the like. The lossless environment utilized by modules 105 and 107 may alternatively include a lossless internal mid-plane connection.

Upon receiving the ownership notification message from client element 106, server element 104 generates stream verification metrics associated with the stream identifier (e.g., Stream ID: 1) indicated in the ownership notification message. In one embodiment, the stream verification metrics includes information indicating the number of total packets belonging to the indicated UDP stream (e.g., Stream ID: 1) that was sent by server element 104 to client element 106. Server element 104 may subsequently generate a response message, which includes the stream verification metrics data, to be sent to client element 106 via lossless backplane connection 110. By providing client element 106 with stream verification information, the present subject matter provides a reliable mechanism by which a UDP packet test system can identify and/or detect UDP packets that are lost at the end of a UDP stream.

Upon receiving the response message containing the stream verification metrics data, client element 106 may generate a loss statistic for the associated UDP stream. In one embodiment, client element 106 may extract the stream verification metrics data from the response message and conduct a packet loss analysis. For example, client element 106 may compare the number of "total packets sent" indicated in the stream verification metrics data with the actual number of UDP packets (belonging to the UDP stream associated with Stream ID: 1) received from server element 104. If the two number values match, then the loss statistic derived by client element 106 will equal to zero and client element 106 will determine that no packets associated with the communicated UDP stream were lost. However, if the two number values do not match, then client element 106 will derive a loss statistic indicating the number of packets lost during the communication of the UDP stream from server element 104 to client element 106.

In some testing scenarios, the entire UDP packet stream may be lost. Specifically, UDP packets associated with the lost UDP stream are not received by any of the UDP test packet receivers (e.g., client element 106) in test environment 100 or test system 102. In such a scenario, the UDP test packet generator (e.g., server element 104) will not receive an ownership notification message associated with the lost UDP stream and may be configured to signal one or more predefined/default UDP test packet receivers with information indicating that the UDP stream was lost (i.e., UDP stream was sent and never received by a UDP test packet receiver). Such complete loss incidents are important to detect and report when test a DUT using UDP packet traffic.

Figure 2:
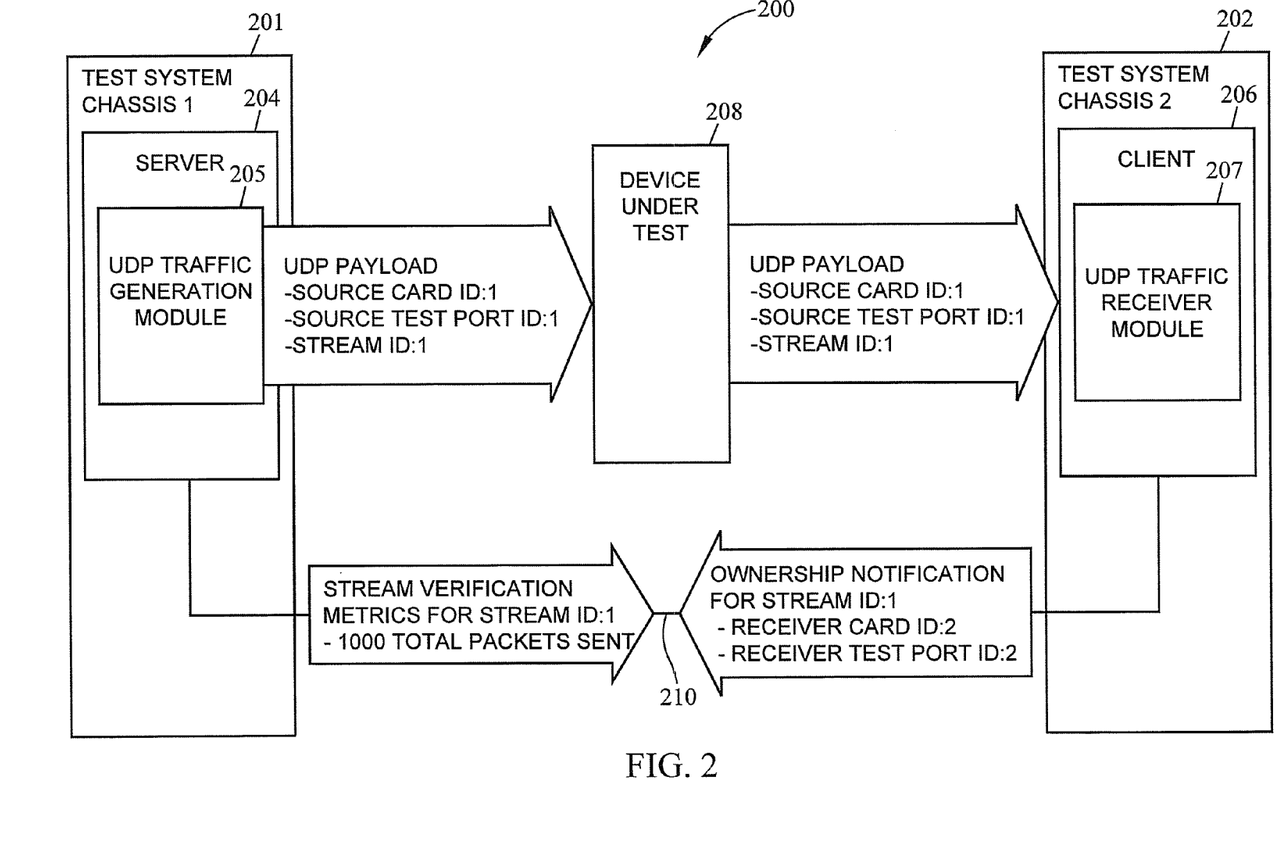
FIG. 2 is a diagram illustrating a test environment utilizing an exemplary inter-port communication pathway to conduct signaling via a lossless external cable connection according to an embodiment of the subject matter described herein.

FIG. 2 is a diagram illustrating a test environment utilizing an exemplary inter-port communication pathway to conduct signaling via an external cable connection according to an embodiment of the subject matter described herein. In the embodiment shown in FIG. 2, the test system includes two separate elements, such as a first test chassis 201 and a second test chassis 202, which may be co-located with a DUT 208 in test environment 200. First test chassis 201 and a second test chassis 202 may also be communicatively coupled via an external connection 210. In one embodiment, the external connection may be an external cable connection.

In one embodiment, server element 204 may contain a UDP traffic generation module 205 that is configured to generate a UDP stream that includes a plurality of UDP packets. Each UDP packet generated by UDP traffic generation module 205 includes a payload section that is configured to contain origination information associated with server element 204, such as a stream identifier, a sequence identifier, an originating (i.e., source) card/blade identifier, and an originating (i.e., source) port identifier. In one embodiment, the generated UDP stream is directed to client element 207 via DUT 208.

In one embodiment, client element 206 may include a UDP traffic receiver module 207 that is configured to receive a UDP stream. For example, UDP traffic receiver module 207 may receive a UDP packet stream generated by UDP traffic generation module 205 and forwarded by DUT 208. Upon receiving a UDP packet from DUT 208, UDP traffic receiver module 207 is configured to access and extract at least a portion of the origination information included in the packet payload, such as the stream identifier (e.g., "Stream ID: 1"), originating card identifier (e.g., Source Card ID: 1) and originating port identifier (e.g., Source Test Port ID: 1). UDP traffic receiver module 207 may then generate an ownership notification message that includes the stream identifier and recipient information, such as a receiver card identifier (e.g., Receiver Card ID: 2) and a receiver test port identifier (e.g., Receiver Test Port ID: 2) associated with client element 206. Notably, the stream identifier included in the ownership notification message serves as an indication that client element 206 is the actual recipient (i.e., the end destination) of the received UDP test stream. The ownership notification message may be addressed to server element 204 using the previously extracted source card identifier and the source port identifier and may be communicated to server element 204 via a lossless environment. In FIG. 2, the lossless environment includes a "no loss" external connection 210. Exemplary external connection 210 may comprise an external cable connection, such as a RS232, Fir2Wire, SATA, E-SATA, SCSI, SAS DAS, fibre channel (FC) or iSCSI cable connection.

Upon receiving the ownership notification message from client element 206, server element 204 generates stream verification metrics associated with the stream identifier (e.g., Stream ID: 1) indicated in the ownership notification message. In one embodiment, the stream verification metrics includes information indicating the number of total packets belonging to the indicated UDP stream (e.g., Stream ID: 1) that was sent by server element 204 to client element 206. Server element 204 may subsequently generate a response message, which includes the stream verification metrics data, to be sent to client element 206 via lossless backplane connection 210.

Upon receiving the response message containing the stream verification metrics data, client element 206 may generate a loss statistic for the associated UDP stream. In one embodiment, client element 206 may extract the stream verification metrics data from the response message and conduct a packet loss analysis in an identical manner discussed above with respect to FIG. 1.

Figure 3:
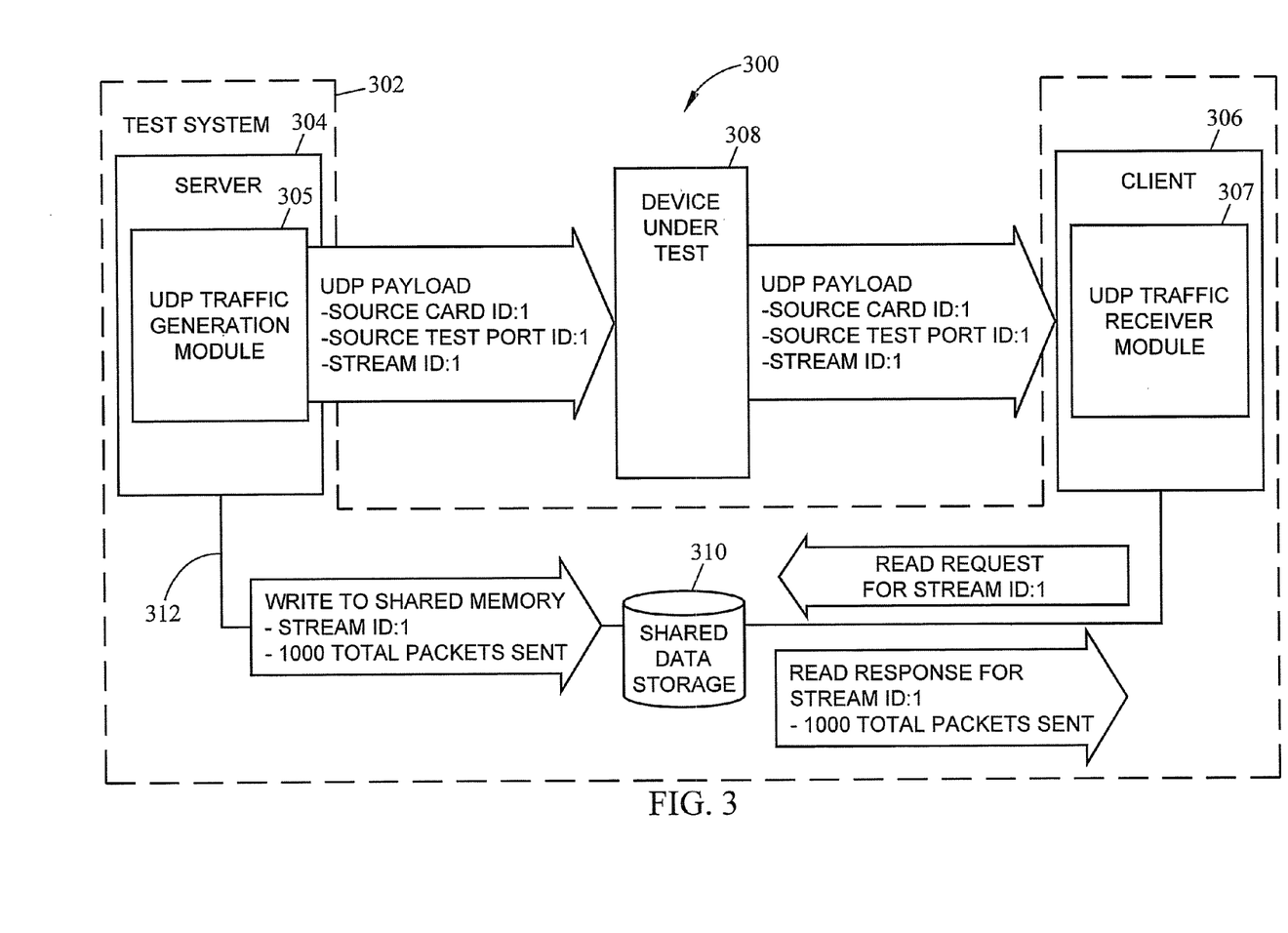
FIG. 3 is a diagram illustrating a test environment utilizing an exemplary inter-port communication pathway to access a shared data storage element according to an embodiment of the subject matter described herein.

FIG. 3 is a diagram illustrating a test environment utilizing an exemplary inter-port communication pathway to conduct signaling via a shared data storage element according to an embodiment of the subject matter described herein. In one embodiment, the shared data storage element may include a local cache or database. In the embodiment shown in FIG. 3, test system 302 may include a server element 304 and client element 306, each of which has communication access to shared data storage element 310. Exemplary shared data storage modules may include random access memory, magnetic storage media (e.g., hard disks), optical storage media (e.g., CD, DVD, or Blu-ray discs), or other non-transitory computer readable media.

In one embodiment, server element 304 may contain a UDP traffic generation module 305 that is configured to generate a UDP stream that includes a plurality of UDP packets. Each UDP packet generated by UDP traffic generation module 305 includes a payload section that is configured to contain origination information associated with server element 304, such as a stream identifier, a sequence identifier, an originating (i.e., source) card/blade identifier, and an originating (i.e., source) port identifier. In one embodiment, the generated UDP stream is directed to client element 307 via DUT 308.

Upon sending the entire generated UDP stream, server element 304 is configured to generate and send a message to shared data storage element 310 via a lossless environment, such as a lossless backplane connection 312. In one embodiment, the message may include a "write" message that serves to provision shared data storage element 310 with an entry indicating the total number of packets sent (i.e., the stream verification metrics data) in the previously generated UDP stream. For example, the message may include the stream identifier (e.g., Stream ID: 1) and the stream verification metrics data (e.g., 1000 total packets sent). In one embodiment, the information may be provisioned as an entry in shared data storage element 310 and indexed by the stream identifier.

In one embodiment, client element 306 may include a UDP traffic receiver module 307 that is configured to receive the generated UDP stream. For example, UDP traffic receiver module 307 may receive the UDP packet stream generated by UDP traffic generation module 305 and forwarded by DUT 308. Upon receiving a UDP packet from DUT 308, UDP traffic receiver module 307 is configured to access and extract at least a portion of the origination information included in the packet payload, such as the stream identifier (e.g., "Stream ID: 1"). UDP traffic receiver module 307 may then generate and a query message that includes the stream identifier to shared data storage element 310 via lossless backplane connection 312. Upon receiving the query message, shared data storage element 310 may access its contents using the stream identifier and obtain the associated stored information (i.e., the stream verification metrics data). In one embodiment, shared data storage element 310 may subsequently generate and send a response message containing the total packets sent data to client element 306 via lossless backplane connection 312.

Upon receiving the response message containing the stream verification metrics data, client element 306 may generate a loss statistic for the associated UDP stream. In one embodiment, client element 306 may extract the stream verification metrics data from the response message and conduct a packet loss analysis in an identical manner discussed above with respect to FIG. 1.

Figure 4:
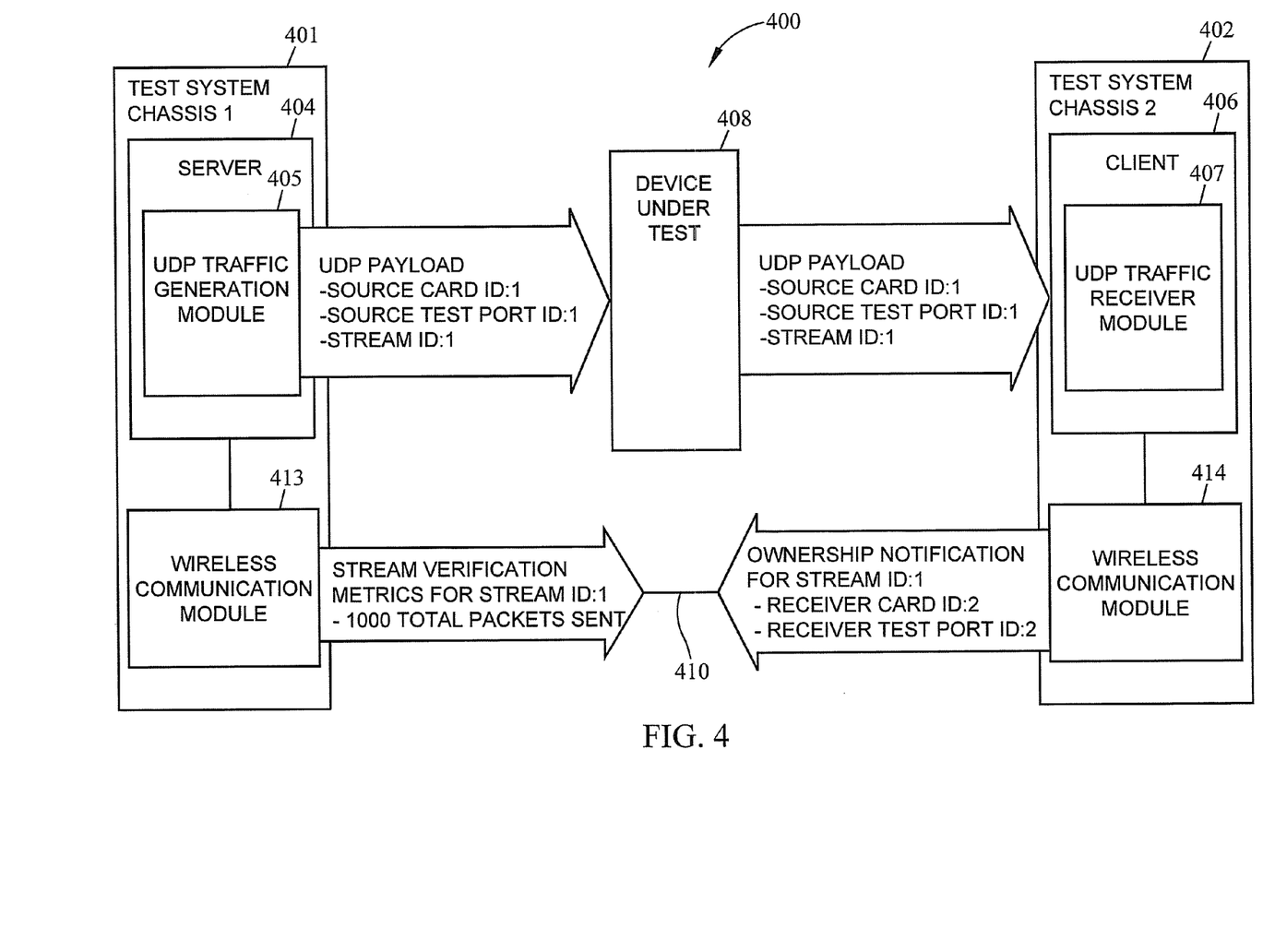
FIG. 4 is a diagram illustrating a test environment utilizing an exemplary inter-port communication pathway to conduct signaling via a lossless wireless connection link according to an embodiment of the subject matter described herein.

FIG. 4 is a diagram illustrating a test environment utilizing an exemplary inter-port communication pathway to conduct signaling via a wireless connection link according to an embodiment of the subject matter described herein. In the embodiment shown in FIG. 4, the test system includes two separate elements, such as a first test chassis 401 and a second test chassis 402, which may be co-located with a DUT 408 in test environment 400. First test chassis 401 and a second test chassis 402 may also be communicatively coupled via wireless communication modules (WCMs) 413 and 414. In one embodiment, WCM 413 and WCM 414 include inter-port WCMs that are configured to establish a "no loss" wireless communication pathway or link that functions as a lossless environment. For example, the lossless wireless connection link may be a Wi-Fi connection, a WiMAX connection, a Bluetooth connection, or the like.

In one embodiment, server element 404 may contain a UDP traffic generation module 405 that is configured to generate a UDP stream that includes a plurality of UDP packets. Each UDP packet generated by UDP traffic generation module 405 includes a payload section that is configured to contain origination information associated with server element 404, such as a stream identifier, a sequence identifier, an originating (i.e., source) card/blade identifier, and an originating (i.e., source) port identifier. In one embodiment, the generated UDP stream is directed to client element 407 via DUT 408.

In one embodiment, client element 406 may include a UDP traffic receiver module 407 that is configured to receive a UDP stream. For example, UDP traffic receiver module 407 may receive a UDP packet stream generated by UDP traffic generation module 405 and forwarded by DUT 408. Upon receiving a UDP packet from DUT 408, UDP traffic receiver module 407 is configured to access and extract at least a portion of the origination information included in the packet payload, such as the stream identifier (e.g., "Stream ID: 1"), originating card identifier (e.g., Source Card ID: 1) and originating port identifier (e.g., Source Test Port ID: 1). UDP traffic receiver module 407 may then generate an ownership notification message that includes the stream identifier and recipient information, such as a receiver card identifier (e.g., Receiver Card ID: 2) and a receiver test port identifier (e.g., Receiver Test Port ID: 2) associated with client element 406. Notably, the stream identifier included in the ownership notification message serves as an indication that client element 406 is the actual recipient (i.e., the end destination) of the received UDP test stream. The ownership notification message may be addressed to server element 404 using the previously extracted source card identifier and the source port identifier and may be communicated to server element 404 over a lossless environment via WCM 414. In FIG. 4, the lossless environment includes a "no loss" wireless connection 410. Lossless wireless connection 410 may comprise a Wi-Fi connection, a WiMAX connection, a Bluetooth connection, or the like.

Upon using WCM 413 to wirelessly receive the ownership notification message from WCM 414 over the lossless wireless communication pathway/link 410, server element 404 generates stream verification metrics associated with the stream identifier (e.g., Stream ID: 1) indicated in the ownership notification message. In one embodiment, the stream verification metrics includes information indicating the number of total packets belonging to the indicated UDP stream (e.g., Stream ID: 1) that was sent by server element 404 to client element 406. Server element 404 may subsequently generate a response message, which includes the stream verification metrics data, to be sent to client element 406 over lossless backplane connection 410 via WCM 413.

Upon using WCM 414 to receive the response message containing the stream verification metrics data from WCM 413 over the lossless wireless communication pathway/link 410, client element 406 may generate a loss statistic for the associated UDP stream. In one embodiment, client element 406 may extract the stream verification metrics data from the response message and conduct a packet loss analysis in an identical manner discussed above with respect to FIG. 1.

Figure 5:
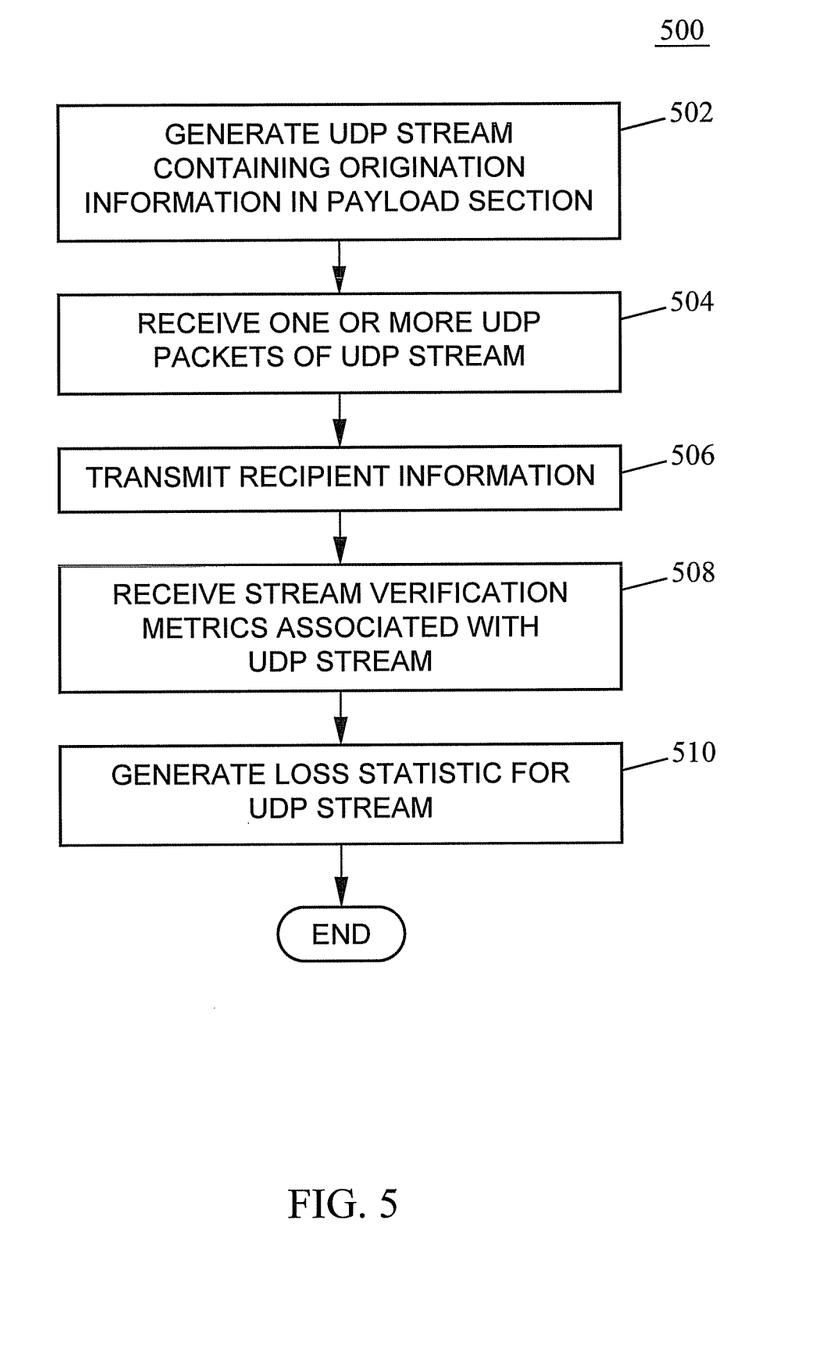
FIG. 5 is a diagram illustrating an exemplary process for utilizing metadata to detect user datagram protocol (UDP) traffic loss according to an embodiment of the subject matter described herein.

FIG. 5 is a diagram illustrating an exemplary method 500 for utilizing metadata to detect user datagram protocol (UDP) traffic loss according to an embodiment of the subject matter described herein. In some embodiments, the exemplary process described herein, or portions thereof, may be performed by a test system, DUT, and/or another node or module. Although FIG. 5 may refer to the embodiment and elements depicted in FIG. 1, any of the embodiments and elements depicted in FIGS. 2-4 may be utilized without departing from the scope of the present subject matter.

In block 502, a UDP stream comprising a plurality of UDP packets with payloads containing origination information is generated. In one embodiment, a UDP test packet generator (e.g., UDP traffic generation module 105) associated with a test system is configured to generate a related sequence of UDP packets that are assigned to a UDP stream. The UDP stream is identified within the test system by a unique stream identifier. Moreover, each UDP packet associated with the stream is modified to include the stream identifier (e.g., Stream ID: 1) in the payload portion of the packet. Also included in the payload portion of the packet is a sequence number identifier (e.g., sequence identifier) which indicates the number and relative order and/or position of the UDP packet within the UDP stream. Each UDP packet in the stream is transmitted from a first test port associated with the server element of the test system. In one embodiment, the first test port is identified by a first card identifier (or blade identifier) and a first port identifier.

In block 504, one or more UDP packets of the UDP stream are received. In one embodiment, UDP traffic generation module 105 transmits the UDP stream to UDP traffic receiver module 107 via a DUT 108. For example, the stream of UDP test packets directed to UDP traffic receiver module 107 may be received by DUT 108, which in turn routes and/or forwards the UDP packets to UDP traffic receiver module 107. In one embodiment, UDP traffic receiver module 107 is configured to examine a received UDP packet associated with a stream and extract from the payload portion of the packet the stream identifier, a sequence identifier, a source card identifier, and source port identifier values previously included in the origination message sent by UDP traffic generation module 105.

In block 506, recipient information is transmitted. In one embodiment, UDP traffic receiver module 107 is configured to signal UDP traffic generation module 105, using the obtained stream identifier, source card identifier, and source port identifier. The purpose of this signaling transaction is to notify UDP traffic generation module 105 of the identity and/or the contact address of UDP traffic receiver module 107 as the receiver of the stream. In addition, the signaling transaction also generally indicates to UDP traffic generation module 105 that at least of portion of the transmitted UDP stream has, in fact, been received. As such, UDP traffic receiver module 107 may include a receiver card identifier and a receiver port identifier in the signaling message that is sent to UDP traffic generation module 105.

In block 508, a response message containing stream verification metrics information is received. Upon receiving of the "ownership" notification signaling message, UDP traffic generation module 105 is adapted to signal UDP traffic receiver module 107 that "owns" the stream with information that can be used to verify the transmitted UDP stream. Exemplary verification information may include, but is not limited to, the total number of UDP packets in the stream that were transmitted, the total size of all UDP packets in the stream that were transmitted, checksum information associated with the UDP packets in the stream that were transmitted, and the like.

In block 510, a loss statistic for the UDP stream is generated. In one embodiment, client element 106 may extract the stream verification metrics data from the response message and conduct a packet loss analysis. For example, client element 106 may compare the number of "total packets sent" indicated in the stream verification metrics data with the actual number of UDP packets in the UDP stream received from server element 104. If the two number values match, then the loss statistic derived by client element 106 will equal to zero and client element 106 will determine that no packets associated with the communicated UDP stream have been lost. However, if the two number values do not match, then client element 106 will derive a loss statistic indicating the number of packets lost during the communication of the UDP stream from server element 104 to client element 106.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for utilizing metadata to detect user datagram protocol (UDP) packet traffic loss, the method comprising:
   generating, at a UDP traffic generation module, a plurality of UDP packets associated with a UDP stream, wherein origination information corresponding to the UDP traffic generation module is included in a payload in each of the plurality of UDP packets;
   receiving, at a UDP traffic receiver module, at least one of the plurality of UDP packets associated with the UDP stream that traverses through a device under test (DUT);
   transmitting, from the UDP traffic receiver module to the UDP traffic generation module, recipient information that identifies the UDP traffic receiver module as the receiver of the UDP stream; and
   receiving, at the UDP traffic receiver module via a secondary communication pathway that bypasses the DUT, stream verification metrics from the UDP traffic generation module, wherein the secondary communication pathway includes a connection link in which data communicated between the UDP traffic generation module and the UDP traffic receiver module is not lost due to the transmission process associated with the secondary communication pathway.

2. The method of claim 1 comprising generating, at the UDP traffic receiver module, a loss statistic for the UDP stream.

3. The method of claim 2 wherein the loss statistic includes the difference between a packet total indicated in the stream verification metrics and a number of UDP packets associated with the UDP stream received at the UDP traffic receiver module.

4. The method of claim 1 wherein the UDP stream is identified by a stream identifier contained in the payload of the UDP packets associated with the UDP stream.

5. The method of claim 1 wherein the UDP stream is communicated from the UDP traffic generation module to the UDP traffic receiver module via the DUT.

6. The method of claim 5 wherein the UDP traffic generation module, the UDP traffic generation module, and the DUT compose a test environment.

7. The method of claim 5 wherein the DUT includes at least one of a network router, a proxy server, or a gateway element.

8. The method of claim 1 wherein transmitting information associated with the UDP traffic receiver module includes transmitting the recipient information associated with the UDP traffic receiver module to a port of the UDP traffic generation module identified in the origination information.

9. The method of claim 1 wherein the secondary communication pathway includes at least one of a backplane connection, an external cable connection, or a wireless communication link.

10. The method of claim 9 wherein the backplane connection includes at least one of an Ethernet fabric, a parallel communication bus, or a serial communication bus.

11. The method of claim 9 wherein the wireless communication link includes at least one of a Wi-Fi connection, a Bluetooth connection, or a WiMAX connection.

12. The method of claim 1 wherein the origination information includes a source card identifier, a source test port identifier, a stream identifier, and a sequence identifier.

13. The method of claim 1 wherein the UDP traffic generation module includes an emulated streaming video server and the UDP traffic receiver module includes an emulated streaming video client.

14. A system for utilizing metadata to detect user datagram protocol (UDP) packet traffic loss, the system comprising:
   a UDP traffic generation module configured to generate a plurality of UDP packets associated with a UDP stream, wherein origination information corresponding to the UDP traffic generation module is included in a payload in each of the plurality of UDP packets; and
   a UDP traffic receiver module configured to receive at least one of the plurality of UDP packets associated with the UDP stream that traverses through a device under test (DUT), to transmit, recipient information that identifies the UDP traffic receiver module as the receiver of the UDP stream to the UDP traffic generation module, and to receive stream verification metrics from the UDP traffic generation module via a secondary communication pathway that bypasses the DUT, wherein the secondary communication pathway includes a connection link in which data communicated between the UDP traffic generation module and the UDP traffic receiver module is not lost due to the transmission process associated with the secondary communication pathway.

15. The system of claim 14 comprising generating, at the UDP traffic receiver module, a loss statistic for the UDP stream.

16. The method of claim 2 wherein the loss statistic includes the difference between a packet total indicated in the stream verification metrics and a number of UDP packets associated with the UDP stream received at the UDP traffic receiver module.

17. The system of claim 14 wherein the UDP stream is identified by a stream identifier contained in the payload of the UDP packets associated with the UDP stream.

18. The system of claim 14 wherein the UDP stream is communicated from the UDP traffic generation module to the UDP traffic receiver module via a device under test (DUT).

19. The system of claim 18 wherein the UDP traffic generation module, the UDP traffic generation module, and the DUT compose a test environment.

20. The system of claim 18 wherein the DUT includes at least one of a network router, a proxy server, or a gateway element.

21. The system of claim 14 wherein transmitting information associated with the UDP traffic receiver module includes transmitting the recipient information associated with the UDP traffic receiver module to a port of the UDP traffic generation module identified in the origination information.

22. The system of claim 14 wherein the secondary communication pathway includes at least one of a backplane connection, an external cable connection, or a wireless communication link.

23. The system of claim 22 wherein the backplane connection includes at least one of an Ethernet fabric, a parallel communication bus, or a serial communication bus.

24. The system of claim 22 wherein the wireless communication link includes at least one of a Wi-Fi connection, a Bluetooth connection, or a WiMAX connection.

25. The system of claim 14 wherein the origination information includes a source card identifier, a source test port identifier, a stream identifier, and a sequence identifier.

26. The system of claim 14 wherein the UDP traffic generation module includes an emulated streaming video server and the UDP traffic receiver module includes an emulated streaming video client.

27. A non-transitory computer readable medium comprising computer executable instructions embodied in a computer readable medium that when executed by a processor of a computer control the computer to perform steps comprising:
  generating, at a user datagram protocol (UDP) traffic generation module, a plurality of UDP packets associated with a UDP stream, wherein origination information corresponding to the UDP traffic generation module is included in a payload in each of the plurality of UDP packets;
  receiving, at a UDP traffic receiver module, at least one of the plurality of UDP packets associated with the UDP stream that traverses through a device under test (DUT);
  transmitting, from the UDP traffic receiver module to the UDP traffic generation module, recipient information that identifies the UDP traffic receiver module as the receiver of the UDP stream; and
  receiving, at the UDP traffic receiver module via a secondary communication pathway that bypasses the DUT, stream verification metrics from the UDP traffic generation module, wherein the secondary communication pathway includes a connection link in which data communicated between the UDP traffic generation module and the UDP traffic receiver module is not lost due to the transmission process associated with the secondary communication pathway.

* * * * *